UNITED STATES PATENT OFFICE.

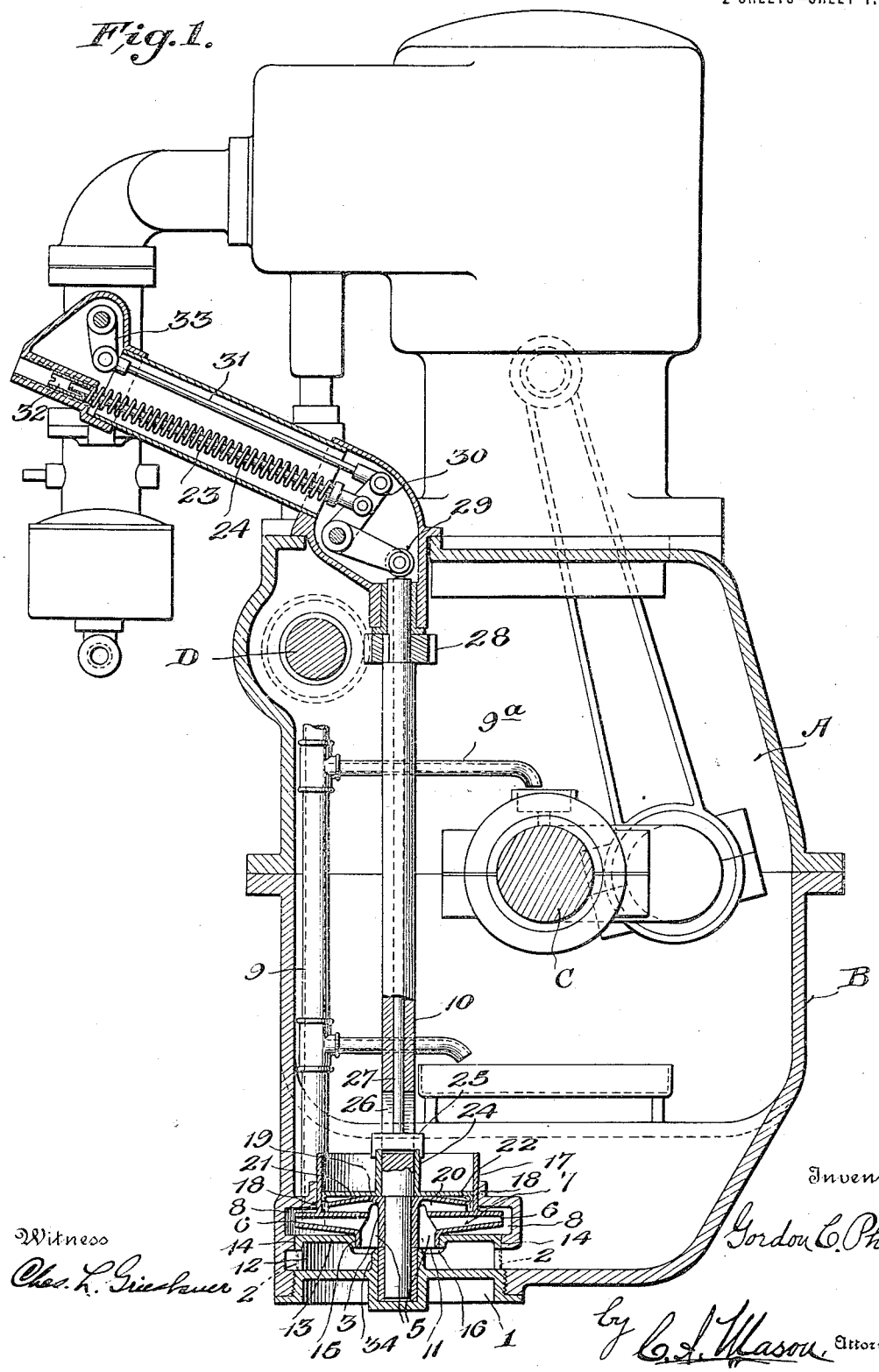

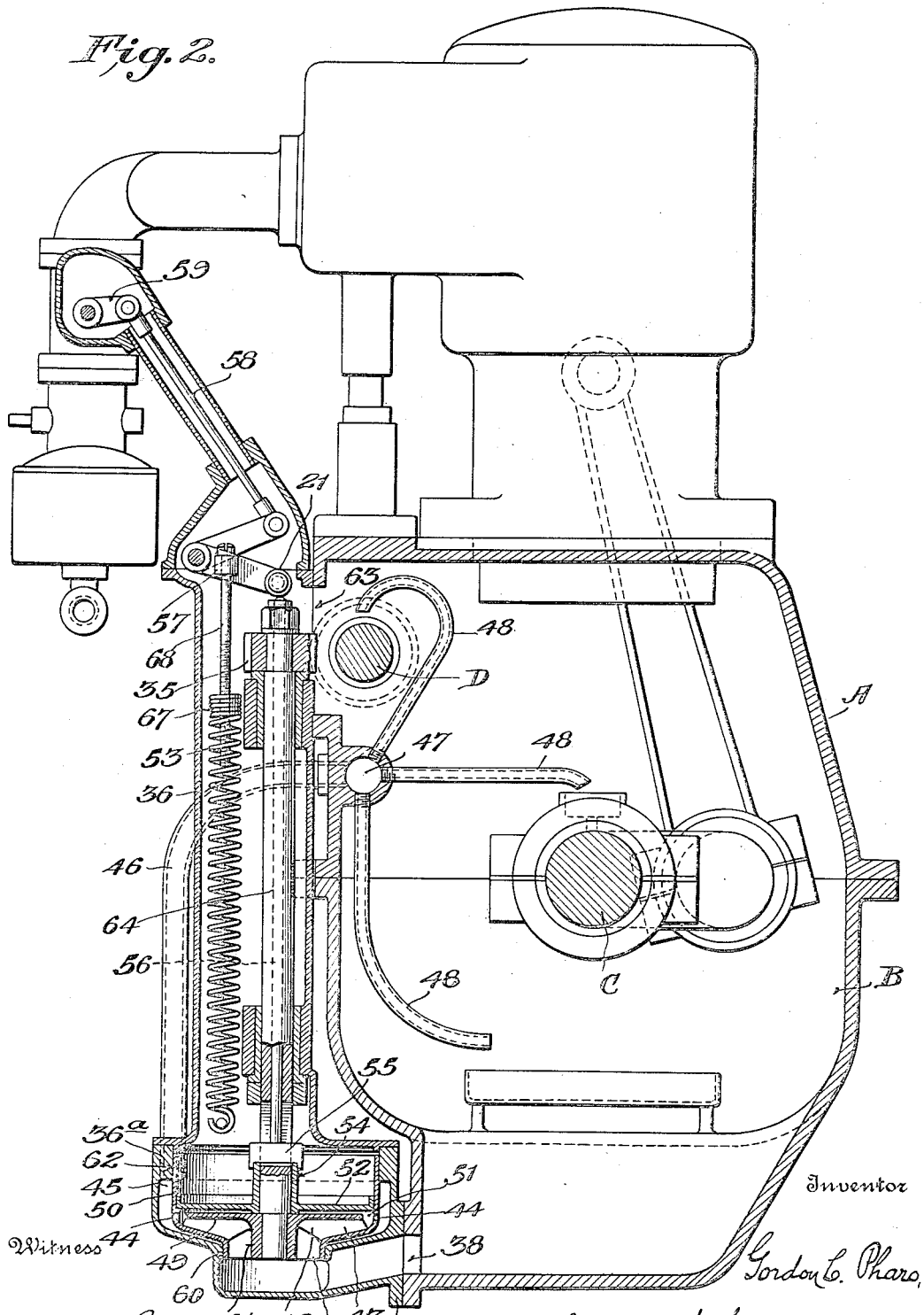

GORDON C. PHARO, OF MARYSVILLE, CALIFORNIA, ASSIGNOR TO THE PHARO MANUFACTURING COMPANY, OF BRIDGEPORT, CONNECTICUT, A CORPORATION OF CONNECTICUT.

COMBINED SPEED-GOVERNOR AND LUBRICATOR.

1,265,813. Specification of Letters Patent. Patented May 14, 1918.

Application filed March 24, 1917. Serial No. 157,130.

*To all whom it may concern:*

Be it known that I, GORDON C. PHARO, a citizen of the United States of America, residing at Marysville, in the county of Yuba and State of California, have invented certain new and useful Improvements in Combined Speed-Governors and Lubricators, of which the following is a full, clear, and exact description.

This invention relates to a combined lubricator and governor for use in gas or gasolene engines, steam engines or other prime movers in which lubricating and speed controlling functions are desirable.

One object of the invention is to provide a simplified method of controlling the speed of a motor by a governor embodying a pump for creating pressure by the liquid discharged from the pump, and at the same time discharging a portion of such liquid under pressure to the several bearings of the motor to lubricate the same, thereby obviating the necessity for using a force feed lubricating pump, or similar device, and materially reducing the number of parts required as compared with the case where a governor and lubricator are installed as independent systems.

Another object of the invention is to provide a speed governing device employing a rotary impeller which performs the two-fold function of governing the speed of the motor and lubricating the bearings, and locating such device in the crank case of the motor so it will stop pumping when the oil becomes so low as to endanger the motor. When the impeller stops pumping from such cause the motor will begin to race and act as a signal to notify the operative that the oil in the crank case has reached the danger point, thus preventing accidents due to burning out the bearings, etc.

The energy for governing the speed of the motor is derived from the pressure generated by the rotation of the impeller which forces such oil against a movable part, as a piston or diaphragm, from which such pressure is communicated to the throttle valve or other controlling element. The piston to which such pressure is transmitted, being submerged in oil, acts in the manner of a dash-pot, and is not injuriously affected by the vibrations which it encounters when the governing device is used on the motor of a traction engine, motor truck, or other motor driven vehicle when the vehicle is driven over rough roads. This is also a very important feature of the invention.

The above, and other objects and advantages of this invention will be better understood from the following description and accompanying drawings which describe and illustrate two preferred embodiments thereof. The invention is not, however, confined to the specific construction, or relative arrangement of parts, shown by way of example in said drawings, but may be varied within wide limits, as contemplated by the terms of the claims hereinafter made.

In the drawings:

Figure 1 shows an end elevation, partly in vertical section, of the crank case of a gasolene or other engine having applied thereto a governor and lubricator, under one form of the invention, and Fig. 2 is a similar view illustrating a modified construction.

Referring first to Fig. 1, the crank case of the engine is shown as composed of two sections A, B, having therein the usual crank shaft C, and cam shaft D, which rotate in suitable bearings supported by the crank case. Under this form of the invention the principal parts of the combined governor and lubricating device are inclosed within the crank case. A rotative part of the motor C, as the cam shaft D, is provided with a worm gear which meshes with a worm 28 keyed to a shaft 10, which latter is supported for rotation in suitable bearings at its opposite ends. Near the lower portion of the shaft 10 the rotary impeller 3 is secured for rotation with said shaft. The impeller is provided with a number of radial vanes 7 which extend from near the inlet port 11, located about the hub of the impeller, to the discharge orifices 6, to provide a series of radial passages for the oil, which latter flows from the bottom part of the crank casing through a screen 2 below the impeller, and enters the suction inlet 11 thereof when the impeller is rotated. The impeller is provided with an upper set of passages 20 which are separated from the lower passages by a horizontal partition or wall, the passages 20 being formed between radial partitions, as in the case of the lower passages. The oil is discharged from the impeller by centrifugal force when the impeller is rotated, and that portion of the oil which flows from the passages 20 acts upon a piston 22, which plays in a cylindrical extension 17 of the impeller, such extension rotating with the impeller and having a ground or running joint with the opening in the casing as indicated at 18, so as to prevent the escape of oil at this point. The piston 22 has a hub 24 surrounding the shaft 10, and said hub operates through a key 25, playing in a keyway 26 in the shaft 10, the key transmitting the pressure of the piston to a rod 27, which reciprocates in a bore of the shaft 10, and acts upon an anti-friction roll 29 carried at the end of an arm of a bell crank 30, which is pivoted to the casing. The other arm of the bell crank 30 is pivotally connected to one end of a rod 31, the other end of which rod is pivoted to an arm 33 which is fastened to the shaft of the throttle valve. A spiral spring 23 surrounds a rod 24, which latter is pivoted at one end to the upper arm of the bell crank 30, between the connection of said arm with the rod 31 and the fulcrum of the bell crank. The outer end of the spring 23 acts upon an adjusting nut 32, which may be turned by a suitable tool to adjust, to the required degree, the amount of tension of the spring 23, and hence the resistance offered by said spring to the movement of the piston 22 under the pressure caused by the liquid pumped against said piston by the impeller 3. As the fluid pressure generated by the rotation of the impeller is dependent upon the speed of the motor the adjustment of the spring 23 will determine the amount of such speed which will be necessary to create pressure on the piston sufficient to close the throttle valve, and by suitably adjusting such tension the permissible speed of the motor may be regulated.

It will thus be seen that that portion of the rotary centrifugal impeller 3 which discharges through the passages 20 constitutes part of the speed governor for the motor.

The liquid discharged from the orifices 6 of the impeller flows into an annular chamber 8, and is thence conducted through a pipe 9, and any suitable number of branch pipes 9ª, connected therewith, to the various bearings of the motor for lubricating the same. The rotary impeller is located at a low point in the base B of the crank case and its suction inlet 11 is positioned properly to indicate to the operator when the oil in the crank case has fallen to the danger point, or where further use of the motor without renewing the oil would result in burning the bearings. When the oil falls below the suction inlet 11, the governor will cease to act upon the throttle valve, thereby permitting the engine to race, and notifying the operator instantly that the oil in the crank case is too low.

The bottom of the crank case is provided with an internally threaded opening which is closed by an externally threaded plug 1, formed with a socket 34 which receives the bearing for the lower end of the shaft 10. This plug, being removable, permits ready access to the rotary piston impeller 3. The plug 1 has an extension which is internally bored to receive the lower cylindrical portion of the impeller, with which such extension has a running joint, as shown at 15, and the extension of the plug is provided with a diaphragm 13 which forms a division between the chambers 8 and 12. The chamber 12 is provided with a number of radial vanes 16, which extend from the screen 2 to the bearing hub 34 and serve to carry the oil, admitted at the screen 2, to the inlet port 11 in the impeller, and to prevent swirling.

It will be understood that when the speed of the engine falls below that which is necessary to overcome the resistance of the spring 23, the latter will force the piston 19, down causing the oil beneath it in the cylinder to flow back through the passages 20 and the inlet port 11 where it will be discharged through passage 7 into the lubricating system.

Referring to Fig. 2, the combined pump and governor illustrated in this view is to be installed on the outside of an engine crank case, and to this end said mechanism is inclosed in an oil tight housing 36 which is bolted to the crank case. A worm gear 35, which is fast to the shaft 64, meshes with a worm gear carried by the cam shaft D of the motor. The housing 36 has a hollow base portion 36ª which is provided with a flange 37, for securing it to the oil reservoir, at the base B of the crank case, and oil is admitted from said reservoir, through an opening 38, to the rotary impeller of the governor.

The shaft 64 is supported for rotation in suitable bearings carried by the housing 36, and the rotary impeller 41 is secured to the lower end portion of the shaft. The impeller under this form of invention comprises a single set of radial passages 43, formed between the vanes 42 which extend from the inlet port 40 of the impeller, to the periphery of the latter. The impeller 41 is provided with a cylindrical extension 62 which is fitted oil tight in the base 36ª, and a piston 52 is mounted to reciprocate in the cylinder 62. The piston 52 has a cylindrical hub 54 which surrounds the shaft 64, and transmits the pressure of the piston, through a key 55, to a rod 56 which reciprocates in a longitudinal bore of the shaft 64. The upper end of the rod 56 acts upon one arm of a bell crank 57, the other arm of said bell crank being connected through a rod 58 with an arm 59 which is rigidly attached to the throttle valve of the engine. Movement of the bell crank to close the throttle valve is resisted by a spiral spring 53, one end of which is attached to a fixed point in the housing 36, while the opposite end is connected with the lower arm of the bell crank through a threaded rod 68, and a nut 67. When the impeller is rotated the liquid is forced centrifugally through the passages 43 thereof, and exerts an upward pressure upon the piston 52, which, through the described connections, closes the throttle valve, more or less, in accordance with the amount of pressure which is exerted upon the piston, the described movement being resisted by the spring 53. As the tension of this spring is adjustable through the rod 68 and nut 67, the amount of pressure required to overcome the spring and close the throttle valve may be predetermined, and hence the speed of the engine governed in the same manner as in the construction disclosed in Fig. 1.

The cylindrical extension 50 is provided with a number of small openings 44 which permit a relatively small portion of the oil discharged by the impeller to pass into an annular chamber 45, the oil being conducted thence by a main pipe 46 to a distributing chamber 47, from which it is conducted by suitable branch pipes 48 to the various bearings of the engine. The combined area of the openings 44 is very much less than the combined area of the passages 43 of the impeller so that the latter will deliver a greater quantity of oil at its periphery than can possibly escape through the openings 44. The top wall 49 of the impeller 41 is smaller in diameter than the inside of the cylinder 50 so that an annular space 51 is formed through which the surplus oil that cannot escape through the openings 44 passes and comes in contact with the piston 52.

When sufficient speed is generated by the engine to create through the impeller a pressure which is superior to the resistance offered by the spring 53, the piston will rise, thereby closing the throttle valve to which it is connected through the sleeve 54, key 55, shaft 56, bell crank 57, rod 58 and arm 59; and when the speed of the engine has been sufficiently reduced, with the attendant reduction of pressure below the piston 52 due to the slowing down of the impeller, the spring 53 will effect a reverse movement of the piston and, through the described connections, will cause the throttle valve to open more or less, thereby maintaining the engine at a given speed. When the piston moves downwardly the oil in the cylinder under the piston will pass through the openings 44 and into the lubricating system and, in the event of a sudden change in the speed of the engine the oil will be caused to return to the crank case through passages 43, port 40 and opening 38. The oil under pressure in the annular chamber 45 is prevented from escaping by the running fit between the lower cylindrical extension of the impeller and the opening in the base 36ª which surrounds such extension, as indicated at 60. Any oil that may leak past the cylindrical portion 50 of the impeller, either on the outside where it fits the casing at 62, or on the inside where it is in contact with the piston, is carried up through the casing 36 around the spring 53, and returned to the crank case through the opening 63.

It will be noted that the impeller illustrated in Fig. 2 differs somewhat in its details from that shown in Fig. 1, and while including a less number of parts than the latter such impeller will be found effective, and if desired may be installed inside the crank case as in the form of the invention shown in Fig. 1. The principal advantage possessed by the form of impeller shown in Fig. 2 over that shown in Fig. 1 is its simplicity, and relatively lower cost of manufacture. It will be noted that in either of the forms illustrated, the impeller is located at a low point in the oil reservoir of the crank case so as to be in position for indicating when the oil has reached a critical point, permitting the engine to race. The operator will thus be warned, by an undue speed of the engine, that the governor is not acting to hold the engine at a predetermined speed, and this will indicate that the oil has fallen to such a low level that the engine bearings would be in danger if the engine was operated further without renewing the oil in the crank case. The invention, in either of its forms, possesses many advantageous and desirable features other than those herein enumerated which will be manifest to those skilled in the art, and it is to be understood that such invention is not confined to the particular constructions and arrangements of parts herein illustrated and described, but may be embodied in many other forms, without departing from the principles thereof.

Having thus described my invention, what I claim as new and desire to secure by Letters Patent of the United States is:

1. A device of the class described having, in combination, a rotary impeller the rotor of which is provided with independent discharge passages, speed governor mechanism controlled by the pressure of discharge from one of said passages, and a lubricating system supplied with oil from the other of said passages.

2. A device of the class described having, in combination, a rotary impeller the rotor of which is provided with a discharge passage, motor speed governing means operated by the pressure of liquid flowing from said passage, and another discharge passage in said rotor with means for receiving liquid therefrom and conducting it to the bearings of a motor.

3. In a combined governor and lubricator, the combination with a rotary impeller having two independent sets of liquid passages arranged at different levels, a relatively movable member for receiving liquid under pressure from one set of passages, speed governing means for a motor operated from said member, and means for conducting the liquid discharged from the other set of passages to the bearings of the motor.

4. In a combined governor and lubricator, a rotary impeller having two independent sets of radial passages located in different planes transversely of its axis of rotation, a movable member operated by the pressure of liquid discharged from one set of passages, motor speed governing devices, including a resisting spring, operated by said member, and oil conduits in communication with the other set of passages in said impeller arranged to conduct the oil discharged from said passages to the bearings of the motor.

5. In a combined governor and lubricator, a rotary impeller having two liquid passages located in different planes transversely of its axis of rotation, a partition separating said passages, a speed governor operating member movable by the pressure of discharge from one of said passages, and a lubricating system arranged to receive the liquid discharged from the other of said passages.

6. In a combined governor and lubricator, a rotary impeller having two independent sets of radial liquid passages located in different transverse planes, an annular discharge chamber surrounding one set of passages, a member movable by the pressure of liquid in said chamber, speed governing means controlled by said member, an annular discharge chamber surrounding the other set of passages, and means for conducting liquid from said chamber to the bearings of the motor controlled by said speed governing means.

7. In a combined governor and lubricator, a rotary impeller having two sets of independent radial passages, a cylinder connected with the impeller, a piston movable in said cylinder under the pressure of liquid discharged from one set of radial passages, speed governing means operated from said piston, and means for conducting lubricant to the bearings of a motor supplied by the discharge from the other set of radial passages.

8. In a combined governor and lubricator, a casing, a shaft supported for rotation therein by a motor, a rotary impeller carried by the shaft and having an axial inlet opening and radial discharge passages, a plug threaded to the casing carrying a bearing for said shaft and an inlet opening to supply oil to said axial opening, speed governing means operated by the liquid discharged from one of said passages, and lubricating means supplied by oil flowing from another of said passages.

9. In a combined governor and lubricator, the combination with a rotary impeller driven from a motor and having separated sets of radial passages and a connected cylinder, an independent annular chamber surrounding each set of passages, a piston movable in said cylinder and arranged to operate motor speed governing means through fluid pressure derived from one of said chambers, and means connected with the other one of said chambers for supplying lubricant to the bearings of the motor.

10. In a combined governor and motor, a rotary impeller having an axial inlet, radial liquid discharge passages, and a cylinder connected with said impeller, a casing having a running joint with said cylinder and formed with annular chambers surrounding the discharge passages, a plug threaded to the casing carrying a bearing for the impeller shaft and having a running joint with said impeller, and governing and lubricating means operated by liquid discharged from said impeller.

11. The combination with a motor, of a rotary impeller driven from said motor, devices for governing the speed of said motor operated by oil discharged from the impeller, means for conducting a portion of said oil to the motor bearings, and means for supplying oil to the impeller from the crank case of the motor at a point which is so located as to stop the operation of the governing devices when the oil in the crank case reaches a predetermined level.

12. The combination with a motor, of an oil pump driven thereby and pressure-operated speed governing devices for the motor operated from said pump, means for conducting oil discharged from said pump to the bearings of the motor, and means for supplying oil to said pump from a point in the crank case of the motor so located as to indicate that the oil is unduly low when through lack of supply the governor ceases to act.

13. The combination with a motor, of an oil pump driven thereby and having its inlet connected with the oil reservoir in the crank case of the motor at approximately the lowest point which is consistent with safety to the bearings, pressure operated speed-governing means for the motor operated by pressure derived from a portion of the liquid discharged by said pump, and means for supplying another portion of said liquid to the bearings of the motor, said parts being so organized that when the oil in the crank case falls to an abnormal level the governor will fail to act, and the racing of the motor will warn the operator.

14. The combination with a motor, of a rotary centrifugal impeller driven thereby, speed governing means including a member movable under pressure derived from liquid discharged from the impeller, an adjustable spring opposing the movement of said impeller, and a motor controlling device operated by said member and spring, means for conducting a portion of the liquid discharged by the impeller to the motor bearings, and means for supplying oil to the impeller from the lowest point in the crank case of the motor at which oil may be carried without danger to the motor, 15. An apparatus of the class described having, in combination, a rotary centrifugal double impeller having a common inlet and two independent discharges, speed governing means operated by the pressure of liquid from one discharge, and a lubricating system supplied with liquid from the other discharge.

In testimony whereof I have hereunto set my hand this 22nd day of March A. D. 1917.

GORDON C. PHARO.

Witnesses:
 NELLIE L. AHEARN,
 H. E. ADELSPERGER.